(12) United States Patent
Bian et al.

(10) Patent No.: US 9,431,937 B2
(45) Date of Patent: Aug. 30, 2016

(54) METHOD FOR INCREASING ROTATIONAL SPEED RANGE OF ECM MOTOR

(71) Applicant: Zhongshan Broad-Ocean Motor Co., Ltd., Zhongshan (CN)

(72) Inventors: Wenqing Bian, Zhongshan (CN); Jianlong Feng, Zhongshan (CN); Yong Zhao, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 142 days.

(21) Appl. No.: 14/543,807

(22) Filed: Nov. 17, 2014

(65) Prior Publication Data

US 2015/0207443 A1 Jul. 23, 2015

(30) Foreign Application Priority Data

Jan. 23, 2014 (CN) .......................... 2014 1 0033713

(51) Int. Cl.
*H02P 6/20* (2016.01)
*H02P 6/14* (2016.01)
*H02P 6/08* (2016.01)
(52) U.S. Cl.
CPC ............... *H02P 6/145* (2013.01); *H02P 6/085* (2013.01); *H02P 6/153* (2016.02)

(58) Field of Classification Search
CPC ............... H02P 6/00; H02P 6/08; H02P 6/20
USPC .......... 318/400.09, 400.11, 400.14, 430, 431
See application file for complete search history.

(56) References Cited

U.S. PATENT DOCUMENTS

| | | | |
|---|---|---|---|
| 6,986,688 B1* | 1/2006 | Jansen ................. | B63H 20/007 440/1 |
| 7,714,529 B2* | 5/2010 | Chen ......................... | H02P 6/16 318/400.38 |
| 9,000,696 B2* | 4/2015 | Sanchez .................. | H02P 6/183 318/400.06 |
| 2006/0125440 A1* | 6/2006 | Gordon ................... | H02P 6/085 318/723 |

\* cited by examiner

*Primary Examiner* — Bentsu Ro
(74) *Attorney, Agent, or Firm* — Matthias Scholl, PC; Matthias Scholl

(57) ABSTRACT

A method for increasing rotational speed range of an ECM motor, including: 1) starting the motor and initializing parameters; 2) reading the rotor position signal from the hall sensor by the microprocessor and updating the rotor angle; 3) reading the DC bus current I and the rotational speed n of the motor; 4) inputting a target rotational speed S from an external device, acquiring the target rotational speed S by the microprocessor, calculating the rotational difference e, and utilizing a rotational speed PI regulator to output a regulating parameter V_D; 5) calculating an advance angle $\alpha = F(I, n)$ by the microprocessor, and calculating a real-time angle of the rotor $\theta = \omega \times t$ by the microprocessor; and 6) calculating a PWM signal input into the inverter circuit, and outputting a PWM chopper voltage U by the inverter circuit, where $U = F(V\_D, \theta + \alpha)$.

10 Claims, 7 Drawing Sheets

METHOD FOR INCREASING ROTATIONAL SPEED RANGE OF ECM MOTOR

CROSS-REFERENCE TO RELATED APPLICATIONS

Pursuant to 35 U.S.C. §119 and the Paris Convention Treaty, this application claims the benefit of Chinese Patent Application No. 201410033713.8 filed Jan. 23, 2014, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to a method for increasing a rotational speed range of an ECM motor.

2. Description of the Related Art

ECM motor, commonly known as electronically commuted motor, for example, a brushless DC (BLDC) motor, has rated rotational speed. However, in use, the rotational speed of the motor is required to broaden (that is, to increase the maximum rotational speed) to adapt to more loads. A typical method for increasing the rotational speed of the motor includes: performing coordinate transformation on a phase current of the motor, conducting vector control to obtain currents Id and Iq on a rotor coordinate system, and regulating the value of Id to realize flux weakening control. However, such a method has tedious operation and occupies a tremendous computing resource of the microprocessor.

Thus, the method imposes high requirement on the microprocessor, thereby leading to high production cost; besides, the method necessitates accurate rotor position and accurate phase current information, thereby resulting in tedious operation.

SUMMARY OF THE INVENTION

In view of the above-described problems, it is one objective of the invention to provide a method for increasing a rotational speed range of an ECM motor. The method adopts an advance angle control rather than the conventional vector flux weakening control to simplify the calculation and the control, decrease the operation requirement on the microprocessor, and decrease the production cost of the products.

To achieve the above objective, in accordance with one embodiment of the invention, there is provided a method for increasing a rotational speed range of an ECM motor. The ECM motor comprises: a stator assembly, a rotor assembly, and a motor controller. The motor controller comprises: a power circuit, a microprocessor, an inverter circuit, a bus current detecting circuit, and a hall sensor. The power circuit supplies power to each circuit. The bus current detecting circuit inputs a DC bus current I into the microprocessor. The hall sensor inputs a rotor position signal to the microprocessor and converts the rotor position signal into a real rotational speed n of the rotor. The microprocessor controls the inverter circuit to drive the stator assembly. The method comprises the following steps:

1) starting the motor and initializing parameters;
2) reading the rotor position signal from the hall sensor by the microprocessor and updating a rotor angle;
3) reading the DC bus current I and the rotational speed n of the motor by the microprocessor;
4) inputting a target rotational speed S from an external device, acquiring the target rotational speed S by the microprocessor, calculating a rotational difference e according to an equation: rotational difference e=target rotational speed S−rotational speed n of motor, and utilizing a rotational speed PI regulator to output a regulating parameter V_D;
5) calculating an advance angle $\alpha=F(I, n)$ by the microprocessor based on the DC bus current I and the rotational speed n of the motor, and calculating a real-time angle of the rotor $\theta=\omega \times t$ by the microprocessor, in which, $\omega$ represents an angular velocity and is calculated based on the rotational speed n of the motor, and t represents a time; and
6) calculating a PWM signal input into the inverter circuit by the microprocessor; outputting a PWM chopper voltage U by the inverter circuit, wherein $U=F(V\_D, \theta+\alpha)$, and repeating step 2).

In a class of this embodiment, the motor is a three-phase motor comprising three-phase windings (a, b, and c). The PWM chopper voltages of the three-phase windings are as follows:

$$Ua = Vbus \times \sin(\theta+\alpha) \times V\_D,$$

$$Ub = Vbus \times \sin(\theta+\alpha+120°) \times V\_D, \text{ and}$$

$$Uc = Vbus \times \sin(\theta+\alpha+240°) \times V\_D,$$

in which, Vbus represents the DC bus voltage and is basically constant.

In a class of this embodiment, the function F(I, n) for calculating the advance angel $\alpha$ in step 5) is $\alpha = K1 \times I + K2 + n \times K3$, in which, K1, K2, and K3 represent coefficients, I represents a DC bus current of the motor measured in real time, and n represents a real time rotational speed of the motor.

In a class of this embodiment, V_D ranges from 0.1 to 1.

In a class of this embodiment, after the DC bus current I and the rotational speed n of the motor are read by the microprocessor in step 3), when the DC bus current I is larger than a maximum DC bus current I-max, or when the rotational speed n of the motor is larger than a maximum rotational speed n-max, the motor is stopped.

In a class of this embodiment, the DC bus current I, the rotational speed n of the motor, the regulating parameter V_D, and the advance angle $\alpha$ are all zeroed in the parameters initialization in step 1).

Advantages according to embodiments of the invention are summarized as follows:

1) The advance angle control is utilized and the advance angle is calculated based on the DC bus current I and the rotational speed n of the motor. The calculation and the control are simplified, and the operation requirement of the microprocessor is decreased, thereby decreasing the production cost. The function F(I, n) for calculating the advance angle $\alpha = K1 \times I + K2 + n \times K3$ is a first order function, thereby further simplifying the calculation and the control and decreasing the operation requirement of the microprocessor.

2) The target rotational speed S input from the external device is acquired by the microprocessor, and the rotational speed difference is calculated according to an equation: rotational difference e=target rotational speed S−rotational speed n of motor. The regulating parameter V_D is output by the rotational speed PI regulator to enable the system to reach the target rotational speed much faster and much reliable.

3) After the DC bus current I and the rotational speed n of the motor are read by the microprocessor in step 3), when the DC bus current I is larger than a maximum DC bus current I-max, or when the rotational speed n of the motor is larger than a maximum rotational speed n-max, the motor is stopped. Thus, the motor is effectively protected.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method for increasing a rotational speed range of an ECM motor, are described below. It should be noted that the following examples are intended to describe and not to limit the invention.

Figure 1:
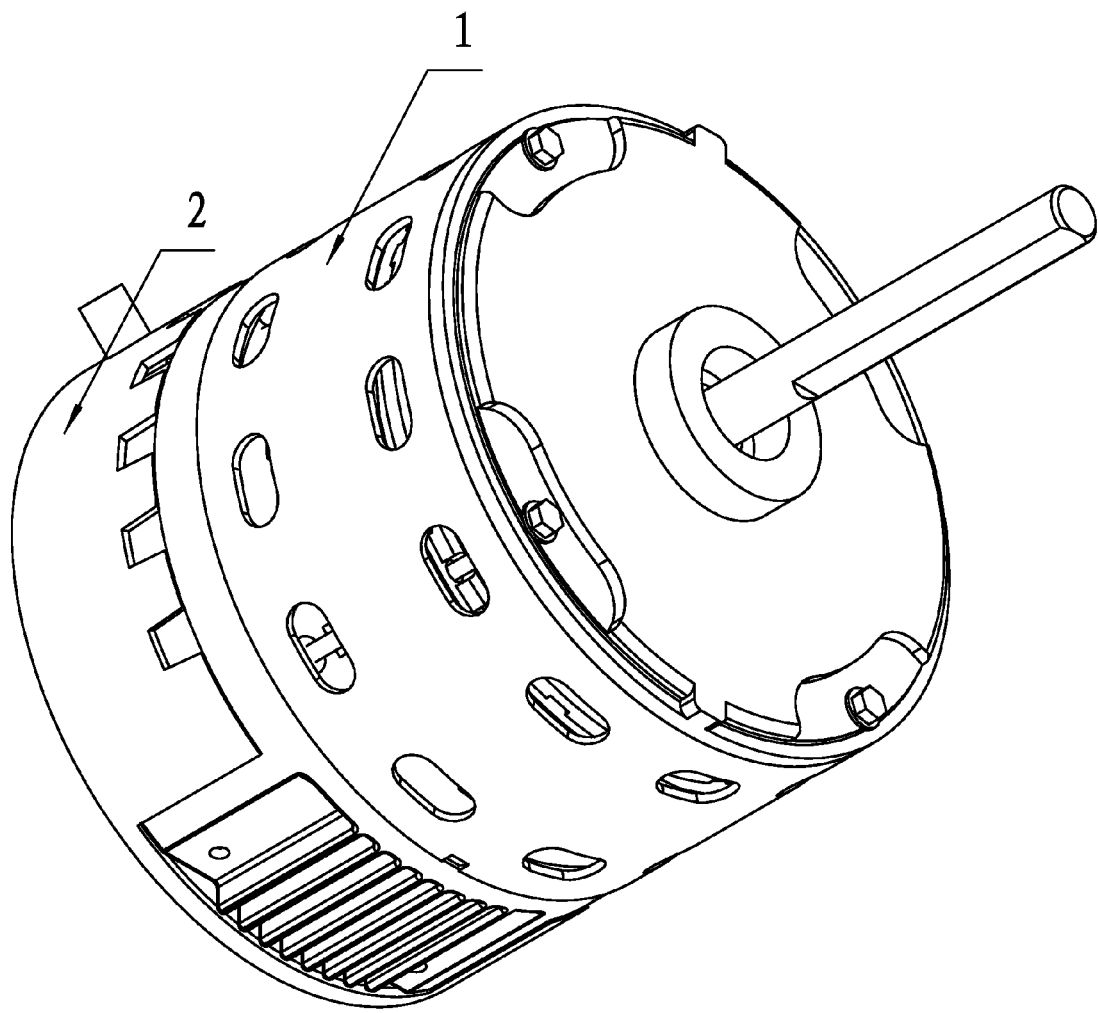
FIG. 1 is a stereogram of an ECM motor in accordance with one embodiment of the invention.
Figure 2:
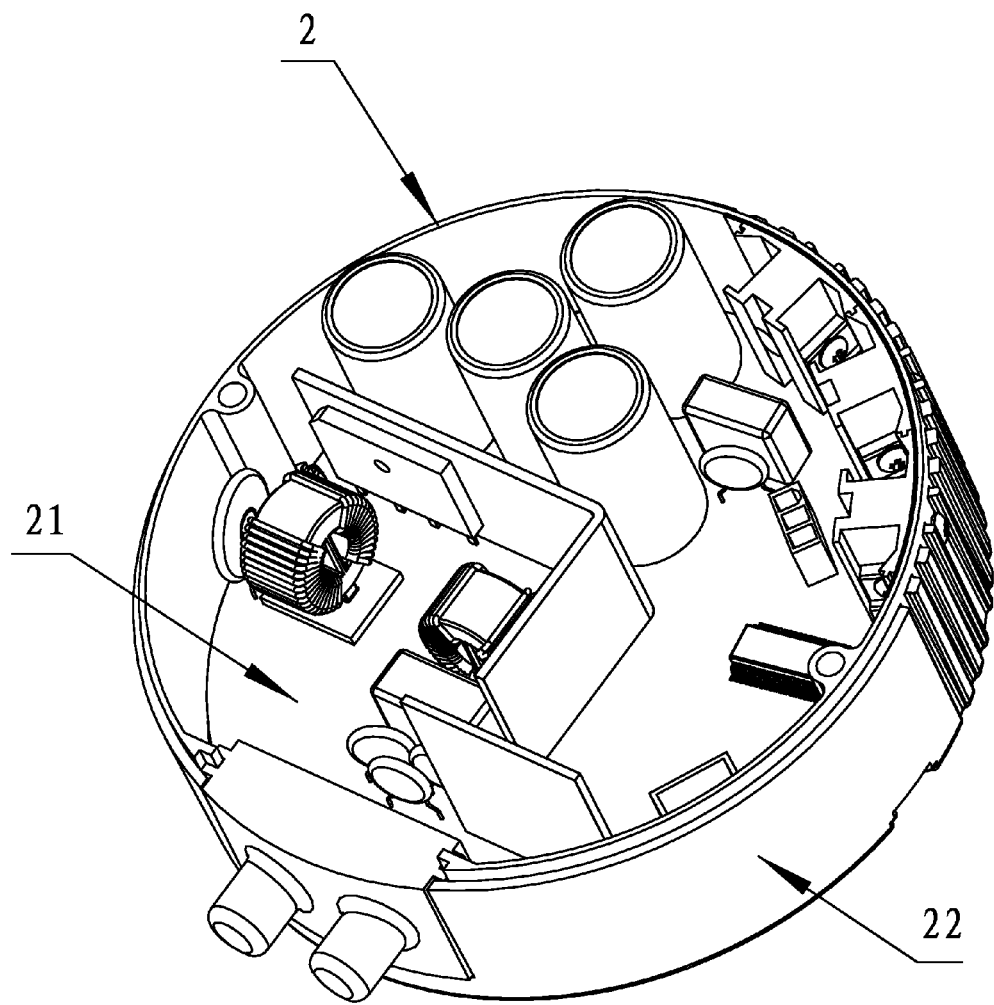
FIG. 2 is a stereogram of a motor controller of an ECM motor in accordance with one embodiment of the invention.
Figure 3:
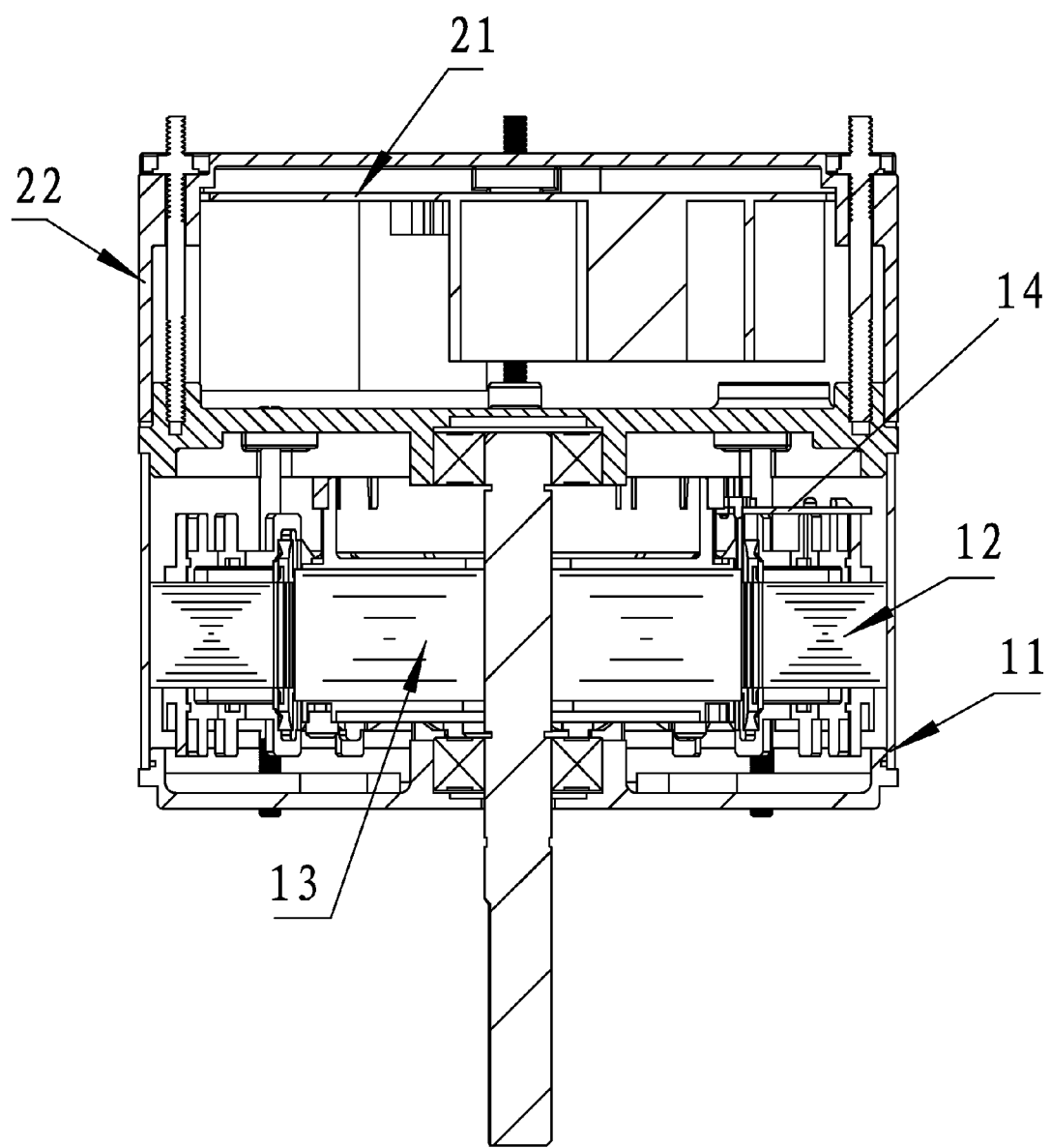
FIG. 3 is a cross sectional view of an ECM motor in accordance with one embodiment of the invention.

As shown in FIGS. 1-3, an ECM motor generally comprises a motor controller 2 and a motor body 1. The motor body 1 comprises: a stator assembly 12, a rotor assembly 13, and a housing assembly 11. The stator assembly 13 is disposed on the housing assembly 11. The motor body 1 is provided with a hall sensor 14 for detecting a rotor position. The rotor assembly 13 is nested within or outside the stator assembly 12. The motor controller 2 comprises a control box 22 and a control board 21 disposed inside the control box 22. The control board 21 generally comprises: a power circuit, a microprocessor, a bus current detecting circuit, an inverter circuit, and the hall sensor 14. The power circuit supplies power to each circuit. The hall sensor 14 detects a rotor position signal and outputs the rotor position signal to the microprocessor. The bus current detecting circuit inputs a detected bus current into the microprocessor, the microprocessor controls the inverter circuit, and the inverter circuit controls an energization state of each coil winding of each phase of the stator assembly.

Figure 4:
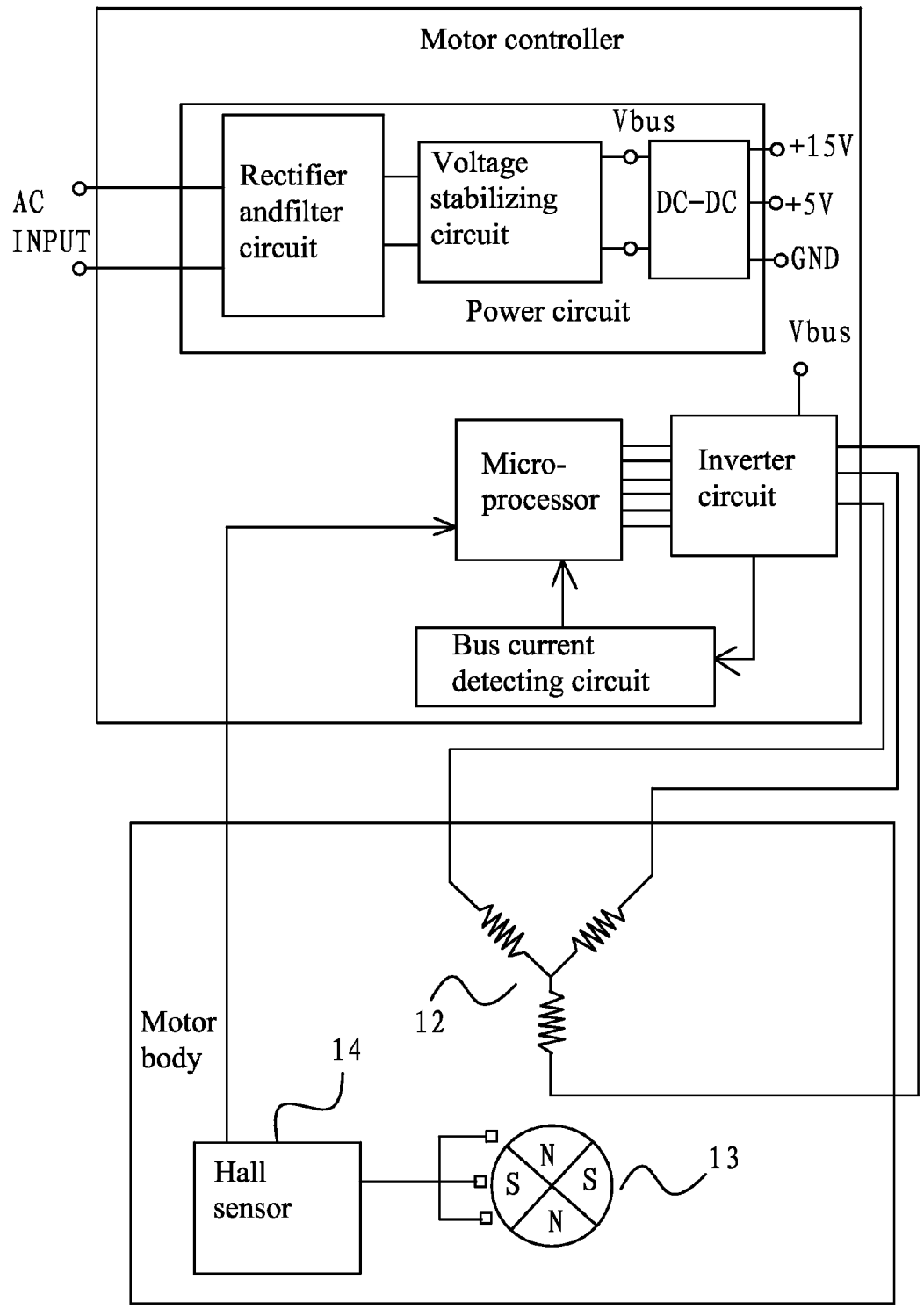
FIG. 4 is a circuit block diagram of a motor controller of an ECM motor in accordance with one embodiment of the invention.
Figure 5:
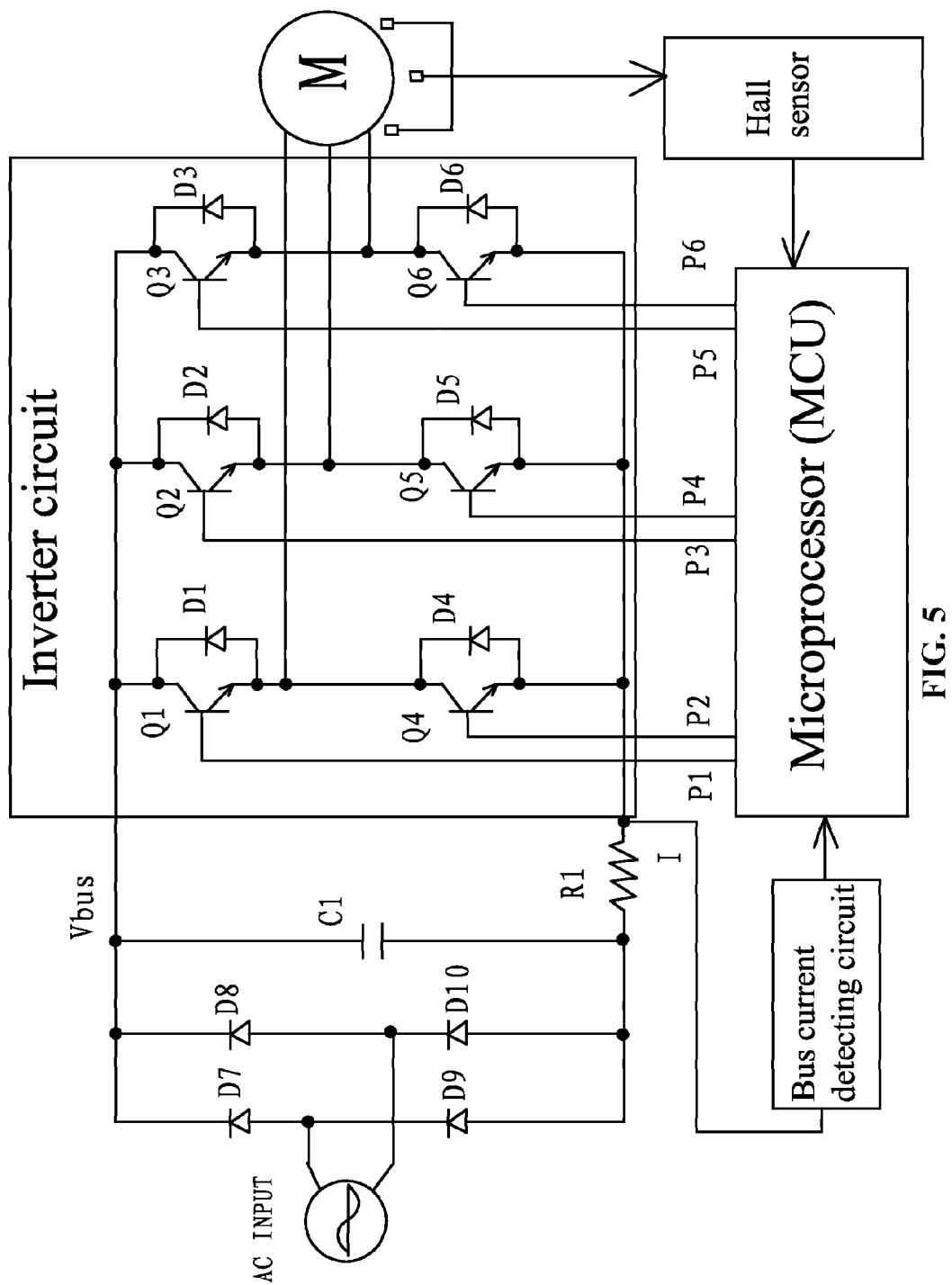
FIG. 5 is a circuit diagram corresponding to FIG. 4.

As shown in FIGS. 4-5, presuming that the ECM motor is a three-phase brushless DC permanent magnet synchronous motor. A rotor position measuring circuit 14 generally utilizes three hall sensors. Each hall sensor detects a rotor position having an electrical angle cycle of 360°. The energization state of the coil winding of each phase of the stator assembly 12 is changed once every 120° of the electrical angle to form a three-phase six-step control mode. The AC input passes through a full-wave rectifying circuit formed by diodes D7, D8, D9, D10, and outputs a DC bus voltage Vbus at one end of a capacitor C1. The DC bus voltage Vbus is in relation to the input AC voltage, and once the voltage of the AC input is determined, the bus voltage Vbus is constant. A line voltage P of the three-phase winding is a PWM chopper output voltage, P=Vbus*w, in which, w represents a duty ratio of a PWM signal input into the inverter circuit by the microprocessor. A DC bus current I can be changed by changing the line voltage P, and the DC bus current I is detected by a resistance R1. The inverter circuit is formed by electric switching tubes Q1, Q2, Q3, Q4, Q5, and Q6. Control ends of the electric switching tubes Q1, Q2, Q3, Q4, Q5, and Q6 are controlled by six paths of PWM signals (P1, P2, P3, P4, P5, and P6) output by the microprocessor. The inverter circuit is further connected to the resistance R1 for detecting the bus current I. The bus current I detected by the resistance R1 is converted by the bus current detecting circuit and then sent to the microprocessor.

Figure 6:
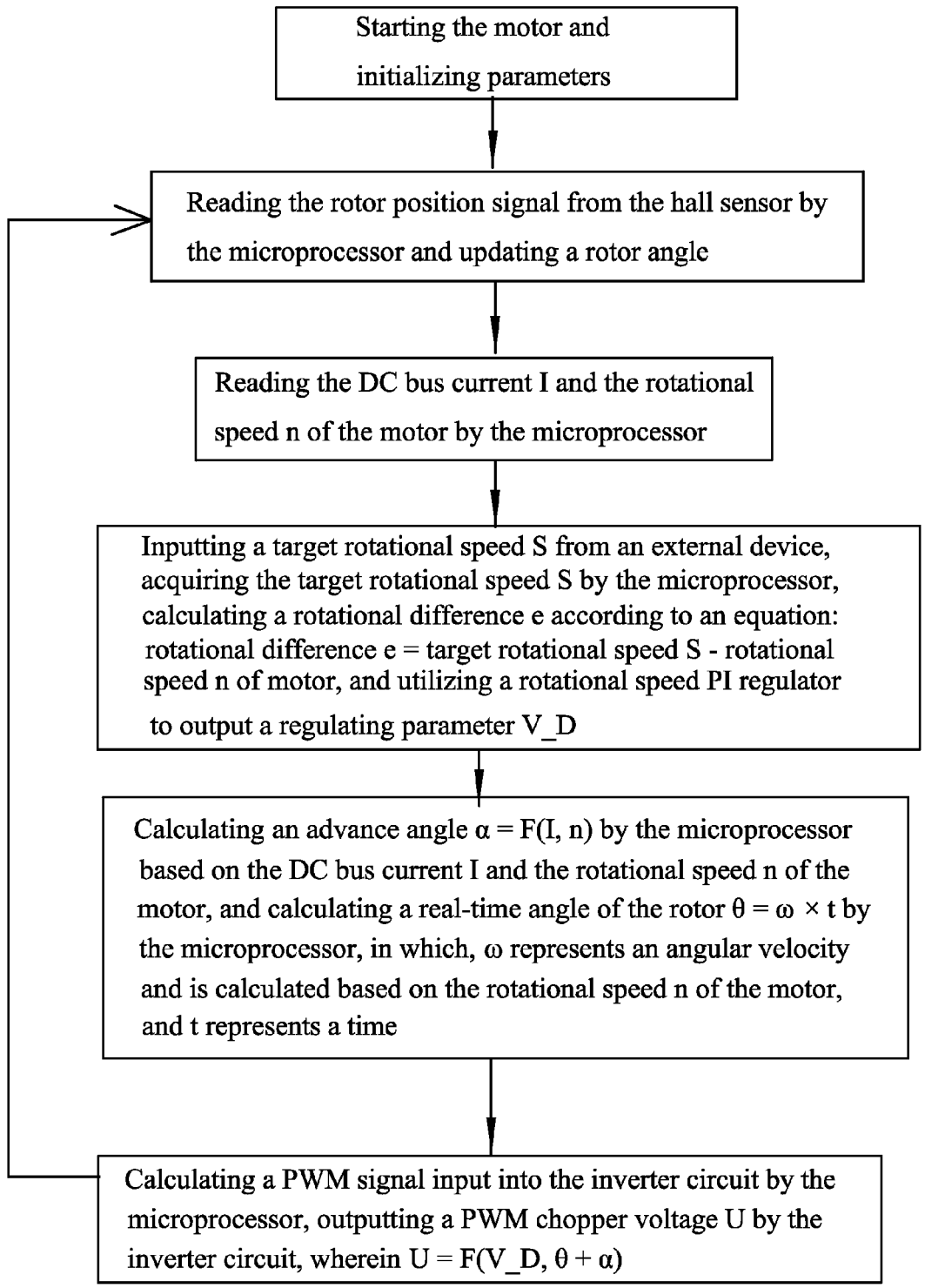
FIG. 6 is a flow chart of a method for increasing a rotational speed range of an ECM motor in accordance with one embodiment of the invention.

As shown in FIG. 6, a control method for increasing a rotational speed range of an ECM motor is illustrated. The ECM motor comprises: the stator assembly; the rotor assembly, and the motor controller. The motor controller comprises: the power circuit, the microprocessor, the inverter circuit, the bus current detecting circuit, and the hall sensor. The power circuit supplies power to each circuit. The bus current detecting circuit inputs the DC bus current I into the microprocessor; the hall sensor inputs a rotor position signal to the microprocessor and converts the rotor position signal into a real rotational speed n of the rotor. The microprocessor controls the inverter circuit to drive the stator assembly. The method comprises the following steps:

1) starting the motor and initializing parameters;
2) reading the rotor position signal from the hall sensor by the microprocessor and updating a rotor angle;
3) reading the DC bus current I and the rotational speed n of the motor by the microprocessor;
4) inputting a target rotational speed S from an external device, acquiring the target rotational speed S by the microprocessor, calculating a rotational difference e according to an equation: rotational difference e=target rotational speed S−rotational speed n of motor, and utilizing a rotational speed PI regulator to output a regulating parameter V_D;
5) calculating an advance angle α=F(I, n) by the microprocessor based on the DC bus current I and the rotational speed n of the motor, and calculating a real-time angle of the rotor θ=ω×t by the microprocessor, in which, ω represents an angular velocity and is calculated based on the rotational speed n of the motor, and t represents a time; and
6) calculating a PWM signal input into the inverter circuit by the microprocessor; outputting a PWM chopper voltage U by the inverter circuit, wherein U=F(V_D, θ+α), and repeating step 2).

The motor is a three-phase motor comprising three-phase windings (a, b, and c). The PWM chopper voltages of the three-phase windings are as follows:

$$Ua = Vbus \times \sin(\theta+\alpha) \times V\_D,$$

$$Ub = Vbus \times \sin(\theta+\alpha+120°) \times V\_D, \text{ and}$$

$$Uc = Vbus \times \sin(\theta+\alpha+240°) \times V\_D,$$

in which, Vbus represents the DC bus voltage and is basically constant.

After the DC bus current I and the rotational speed n of the motor are read by the microprocessor in step 3), when the DC bus current I is larger than a maximum DC bus current I-max, or when the rotational speed n of the motor is larger than a maximum rotational speed n-max, the motor is stopped to protect the motor.

The DC bus current I, the rotational speed n of the motor, the regulating parameter V_D, and the advance angle α are all zeroed in the parameters initialization in step 1).

Figure 7:
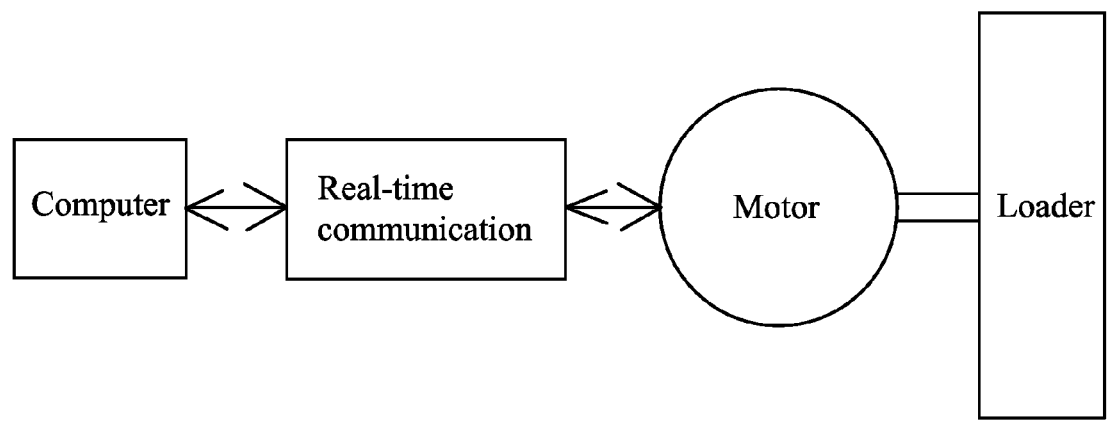
FIG. 7 is an experimental schematic diagram of an advance angle acquired by experimental means.

As shown in FIG. 7, a rated rotational speed is generally labeled on a nameplate of a motor. The rotational speed of the motor during operation cannot exceed the rated rotational speed of the motor, however, it is often required in practical application to broaden the rotational speed of the motor (that is, to increase the maximum rotational speed of the motor for meeting the requirement) to adapt to more loads.

Experiment is conducted as follows: an output shaft of the motor is connected to a loader, operating parameters of the motor are transmitted to a computer by real-time communication, and control commands are transmitted from the computer to the motor.

A) Provide a maximum rotational speed command n-max of the motor, set the motor in a constant rotational speed mode, and increase an advance angle θ in real time to enable the rotational speed of the motor to reach the maximum rotational speed n-max; gradually load the motor by the loader until a power output by the motor satisfies the requirement; adjust the advance angle α to ensure a highest power output by the motor, and record a DC bus current I-max and an advance angle α1 of the motor;

B) Provide a rated rotational speed n-rate of the motor, set the motor in the constant rotational speed mode, and increase the advance angel θ in real time to enable the rotational speed to reach n-rate; gradually load the motor by the loader until a power output by the motor satisfies the requirement; adjust the advance angle θ to ensure a highest power output by the motor and record a DC bus current I2 and an advance angle α2;

C) Provide a rated rotational speed n-rate, set the motor in a constant rotational speed mode, increase the advance angle θ in real time to enable the rotational speed to reach n-rate; gradually load the motor by the loader, ensure that a power output by the motor is equivalent to ½ of the maximum power, and record a DC bus current I3 and an advance angle α3; and D) According to the formula: α=K1×I+K2+n×K3, ensure that when n=n-rate and I=I2, α=α2, when n=n-max and I=I-max, α=α1, and when n=n-rate and I=I3, α=α3. K1, K2, and K3 are calculated based on the above ternary linear equation. I represents the DC bus current value of the motor measured in real time, n represents the real time rotational speed, so that the function α=F(I, n) is obtained.

The microprocessor acquires the externally input target rotational speed S in step 4), the rotational speed difference is calculated according to rotational speed difference e=target rotational speed S−rotational speed n of motor. The regulating parameter V_D is output by the rotational speed PI regulator. The rotational speed PI regulator is a pure hardware or software PI regulator. The output regulating parameter V_D=Kp×e+∫Ki×e×dt, in which, Kp represents an amplification factor, Ki represents an integral coefficient. Such parameters are in relation to the performance of the PI regulator. The regulating parameter V_D output by the rotational speed PI regulator ranges from 0.1 to 1. When the target rotational speed S is significantly different from the measured rotational speed, V_D=1, so that the motor is enabled to reach the target rotational speed S as soon as possible. The PI regulator adopts the prior art and will not be described herein.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for increasing rotational speed range of an ECM motor, the ECM motor comprising:
   a) a stator assembly;
   b) a rotor assembly; and
   c) a motor controller, the motor controller comprising: a power circuit, a microprocessor, an inverter circuit, a bus current detecting circuit, and a hall sensor; the power circuit supplying power to each circuit; the bus current detecting circuit inputting a DC bus current I into the microprocessor; the hall sensor inputting a rotor position signal to the microprocessor and converting the rotor position signal into a real rotational speed n of the rotor; the microprocessor controlling the inverter circuit to drive the stator assembly; and the method comprising the following steps:
   1) starting the motor and initializing parameters;
   2) reading the rotor position signal from the hall sensor by the microprocessor and updating a rotor angle;
   3) reading the DC bus current I and the rotational speed n of the motor by the microprocessor;
   4) inputting a target rotational speed S from an external device, acquiring the target rotational speed S by the microprocessor, calculating a rotational difference e according to an equation: rotational difference e=target rotational speed S−rotational speed n of motor, and utilizing a rotational speed PI regulator to output a regulating parameter V_D;
   5) calculating an advance angle α=F(I, n) by the microprocessor based on the DC bus current I and the rotational speed n of the motor, and calculating a real-time angle of the rotor θ=ω×t by the microprocessor, in which, ω represents an angular velocity and is calculated based on the rotational speed n of the motor, and t represents a time; and
   6) calculating a PWM signal input into the inverter circuit by the microprocessor, outputting a PWM chopper voltage U by the inverter circuit, wherein U=F(V_D, θ+α), and repeating step 2).

2. The method of claim 1, wherein
the motor is a three-phase motor comprising three-phase windings (a, b, and c);
the PWM chopper voltages of the three-phase windings are as follows:

$$Ua=Vbus\times\sin(\theta+\alpha)\times V\_D,$$

$$Ub=Vbus\times\sin(\theta+\alpha+120°)\times V\_D, \text{ and}$$

$$Uc=Vbus\times\sin(\theta+\alpha+240°)\times V\_D,$$

in which, Vbus represents the DC bus voltage and is basically constant.

3. The method of claim 2, wherein the function F(I, n) for calculating the advance angel α in step 5) is α=K1×I+K2+n×K3, in which, K1, K2, and K3 represent coefficients, I represents a DC bus current of the motor measured in real time, and n represents a real time rotational speed of the motor.

4. The method of claim 2, wherein V_D ranges from 0.1 to 1.

5. The method of claim 2, wherein in step 3), after the DC bus current I and the rotational speed n of the motor are read by the microprocessor, when the DC bus current I is larger than a maximum DC bus current I-max, or when the rotational speed n of the motor is larger than a maximum rotational speed n-max, the motor is stopped.

6. The method of claim 2, wherein the DC bus current I, the rotational speed n of the motor, the regulating parameter V_D, and the advance angle α are all zeroed in the parameters initialization in step 1).

7. The method of claim 1, wherein the function F(I, n) for calculating the advance angel α in step 5) is α=K1×I+K2+n×K3, in which, K1, K2, and K3 represent coefficients, I represents a DC bus current of the motor measured in real time, and n represents a real time rotational speed of the motor.

8. The method of claim 1, wherein V_D ranges from 0.1 to 1.

9. The method of claim 1, wherein in step 3), after the DC bus current I and the rotational speed n of the motor are read by the microprocessor, when the DC bus current I is larger than a maximum DC bus current I-max, or when the rotational speed n of the motor is larger than a maximum rotational speed n-max, the motor is stopped.

10. The method of claim 1, wherein the DC bus current I, the rotational speed n of the motor, the regulating parameter V_D, and the advance angle α are all zeroed in the parameters initialization in step 1).

* * * * *